United States Patent
Wilson

(10) Patent No.: US 7,632,099 B2
(45) Date of Patent: Dec. 15, 2009

(54) MEASUREMENT SYSTEM APPARATUS AND METHOD OF TEACHING UNITS OF MEASUREMENT

(76) Inventor: Perry Wilson, 515 Sandis Dr., Sommerville, TN (US) 38068

( * ) Notice: Subject to any disclaimer, the term of this patent is extended or adjusted under 35 U.S.C. 154(b) by 547 days.

(21) Appl. No.: 11/290,856

(22) Filed: Nov. 30, 2005

(65) Prior Publication Data

US 2007/0122777 A1  May 31, 2007

(51) Int. Cl.
*G09B 19/02* (2006.01)
(52) U.S. Cl. ........ 434/187; 434/188
(58) Field of Classification Search ........... 434/188, 434/191, 195, 196, 200, 204, 205, 207, 187
See application file for complete search history.

(56) References Cited

U.S. PATENT DOCUMENTS

| | | | | |
|---|---|---|---|---|
| 480,119 | A | | 8/1892 | McCourt |
| 571,567 | A | * | 11/1896 | Jouve .................. 434/195 |
| 1,471,437 | A | * | 10/1923 | Wood .................. 434/195 |
| 1,649,578 | A | * | 11/1927 | Deming ............... 434/196 |
| 2,494,469 | A | * | 1/1950 | Booth .................. 434/196 |
| 2,494,497 | A | * | 1/1950 | Trapnell .............. 434/204 |
| 2,635,355 | A | | 4/1953 | Thompson et al. |
| 2,835,988 | A | * | 5/1958 | Hilkene ............... 434/195 |
| 2,926,432 | A | * | 3/1960 | Helberg ............... 434/196 |
| 2,930,146 | A | * | 3/1960 | Cassel ................. 434/196 |
| 3,171,217 | A | * | 3/1965 | Birdsall .............. 434/196 |
| 3,204,343 | A | * | 9/1965 | Pollock ............... 434/195 |
| 3,229,388 | A | * | 1/1966 | Smith .................. 434/195 |
| 3,465,453 | A | | 9/1969 | Sganga |
| 3,837,569 | A | * | 9/1974 | Bradbury et al. ....... 235/70 R |
| 4,075,770 | A | * | 2/1978 | Lill .................... 434/187 |
| 4,144,657 | A | * | 3/1979 | Dumovich ............ 434/187 |
| 4,614,042 | A | * | 9/1986 | Maurer ................ 33/494 |
| 4,838,794 | A | | 6/1989 | Coddington |
| 5,297,965 | A | * | 3/1994 | Manancero ........... 434/195 |
| 5,421,732 | A | * | 6/1995 | Taylor ................. 434/195 |
| 5,597,308 | A | * | 1/1997 | Woldenberg et al. ... 434/196 |
| 5,679,002 | A | * | 10/1997 | Scelzo ................. 434/196 |
| 5,683,252 | A | * | 11/1997 | Tsao .................... 434/195 |
| 6,033,282 | A | | 3/2000 | Lin |
| 6,192,594 | B1 | * | 2/2001 | Wackowski ........... 33/494 |
| 6,206,701 | B1 | | 3/2001 | Kohlberg |
| 6,243,959 | B1 | * | 6/2001 | Monck ................. 33/494 |
| 6,575,754 | B2 | * | 6/2003 | Salvo .................. 434/195 |
| 6,758,675 | B2 | * | 7/2004 | Karabaic .............. 434/189 |

OTHER PUBLICATIONS

Educational game provided by Jumbo Cuisenaire Rods. The game provides a visual aid for teaching various mathematical concepts. Selected pages from the teacher's manual are provided, pp. 1-32, 72-79.

\* cited by examiner

*Primary Examiner*—Kurt Fernstrom
(74) *Attorney, Agent, or Firm*—Raymond R. Ferrera; Adams and Reese LLP

(57) ABSTRACT

A measurement system apparatus is provided, which includes an elongated bar and a plurality of discrete measurement unit pieces received along the bar. The elongated bar is metered in accordance with a measurement system. Each measurement unit piece represents an incremental unit of the measurement system. A method is also provided for instructing a student as to a measurement system which generally includes the steps of providing an elongated bar, with the bar being metered along its length to reflect incremental units of a measurement system, providing a plurality of measurement unit pieces corresponding to the metered incremental units of the measurement system, and placing selected measurement unit pieces along the elongated bar.

12 Claims, 4 Drawing Sheets

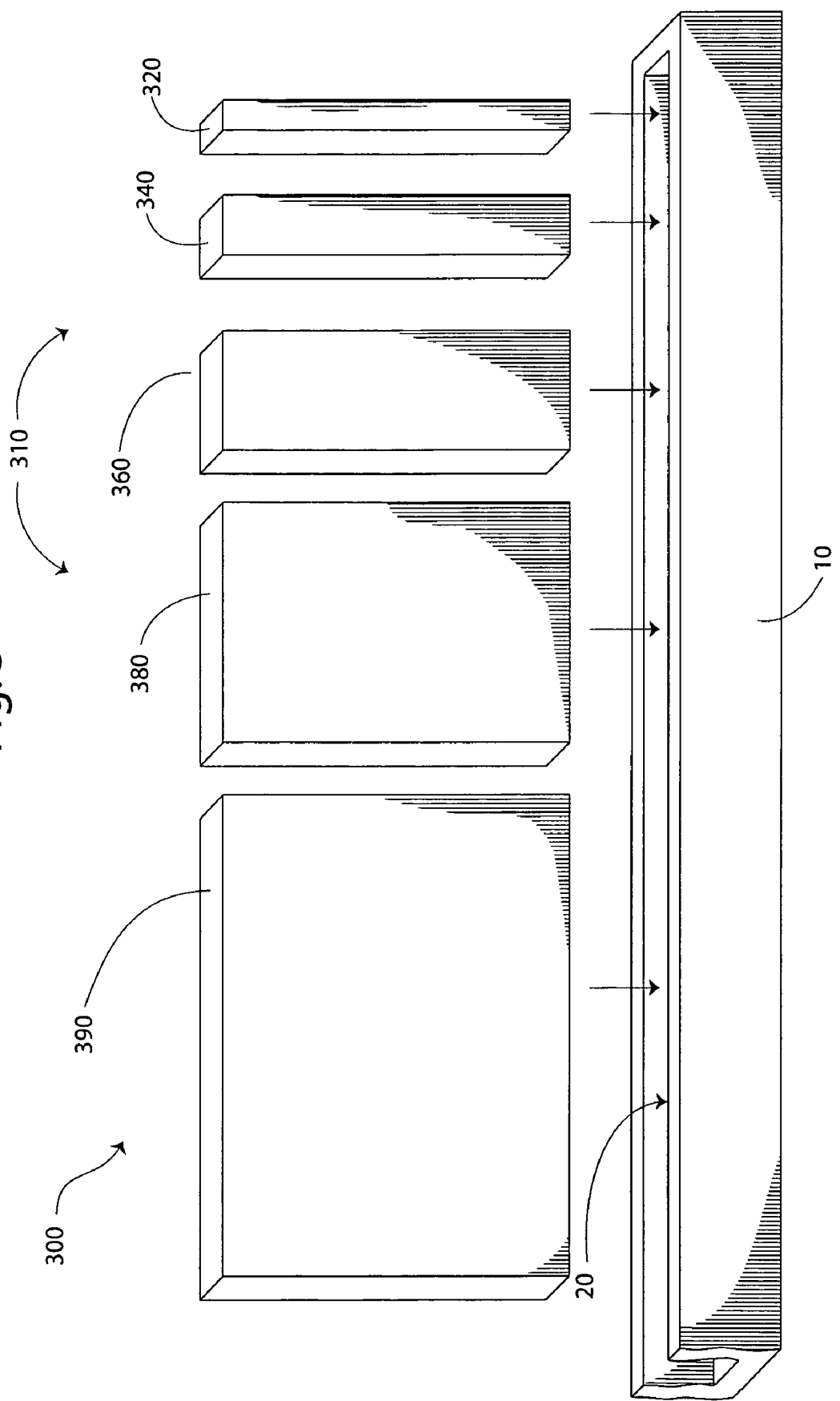

MEASUREMENT SYSTEM APPARATUS AND METHOD OF TEACHING UNITS OF MEASUREMENT

BACKGROUND OF THE INVENTION

1. Field of the Invention

The present invention generally relates to educational devices. More particularly, the present invention relates to a measurement system apparatus and method for teaching units of measurement.

2. Description of the Related Art

Simply viewing a measurement device such as a ruler or measuring cup having units of measurement and comprehending those units can be a challenging task for a young student. Perceiving and conceptualizing increments of measurement may be especially difficult for students with learning disabilities. One method of alleviating this difficulty is through the use of visual educational tools.

Various attempts have been made to construct visual indicia for teaching measurement systems. In one instance, U.S. Pat. No. 480,119 discloses identically sized inseparable blocks connected in a linear array for teaching a variety of measurement systems. In another instance, U.S. Pat. No. 2,635,355 discloses an educational tool having sequentially sized blocks used to illustrate different values to teach addition and subtraction. This tool, however, is not used to teach a measurement system.

Still other education tools have been provided having various measurement pieces. The apparatus disclosed in U.S. Pat. No. 3,465,453 utilizes discs to illustrate the relationship between the radius and circumference of a circle. In another instance, an educational device as disclosed in U.S. Pat. No. 6,033,282 provides a built-up measuring device having elements adapted to receive a plurality of cubes.

Therefore, there is a need for a new educational tool capable of aiding the student's comprehension of various measurement systems. Further, there is a need for an educational tool for teaching measurement systems having measurement unit pieces capable of representing various units of measurement. Further, there is a need for a method of teaching measurement systems through the use of an apparatus capable of receiving measurement pieces as visual aids. Various embodiments of a measurement system apparatus are offered here which meet certain of these needs.

SUMMARY OF THE INVENTION

A measurement system apparatus is first provided. The apparatus in one embodiment includes an elongated bar having opposing ends, and a plurality of discrete measurement unit pieces received along the bar. The elongated bar is metered in accordance with a measurement system. Each measurement unit piece represents an incremental unit of the measurement system.

The measurement system in the apparatus may be a system of length or a system of volume or any other measurement system. Examples in a linear system may include the English standard system having incremental units of ½, ¼, ⅛, and ¹⁄₁₆ inches, or a metric system having incremental units of decimeters and at least one meter. Examples in a volumetric system may include an English standard system having incremental units of cups, quarts and gallons, or a metric system having incremental units of milliliters and at least one liter. The values of the measurement unit pieces may be correlated by size, color, or other means.

In one aspect, the elongated bar includes a base, opposing side walls along the base, and a channel defined by the opposing side walls wherein at least one of the side walls is metered.

A method of instructing a student as to a measurement system is also provided. In one embodiment, the method includes the step of providing an elongated bar, with the bar being metered along its length to reflect incremental units of a measurement system. The method also includes the step of providing a plurality of measurement unit pieces corresponding to the metered incremental units of the measurement system. In addition, the step of placing selected measurement unit pieces along the elongated bar is provided.

The metered units may be units of length, volume, or other measurement system. The system may be either metric, standard English, or other system. The metered units may also be representative of a musical system, depicting whole notes and subunits thereof.

BRIEF DESCRIPTION OF THE DRAWINGS

So that the manner in which the above recited features of the present invention can be better understood, certain drawings are appended hereto. It is to be noted, however, that the appended drawings illustrate only selected embodiments of the inventions and are therefore not to be considered limiting of scope, for the inventions may admit to other equally effective embodiments and applications.

FIG. 3 presents a perspective view of a measurement system apparatus of the present invention, in an alternative embodiment.

DETAILED DESCRIPTION

Definitions

As used herein, the term "bar" refers to any elongated object for receiving measurement unit pieces, and may be fabricated from any material. The bar may be a physical object or may be an object graphically represented through a computer-implemented program.

As used herein, the term "measurement unit piece" refers to any object representing a measurement system unit, and may be fabricated from any material. The measurement unit piece may be a physical object or may be an object graphically represented through a computer-implemented program.

As used herein, the term "unit" refers to any structural or functional constituent of a whole and may be based in the English standard system or metric system.

Description of Specific Embodiments

Figure 1:
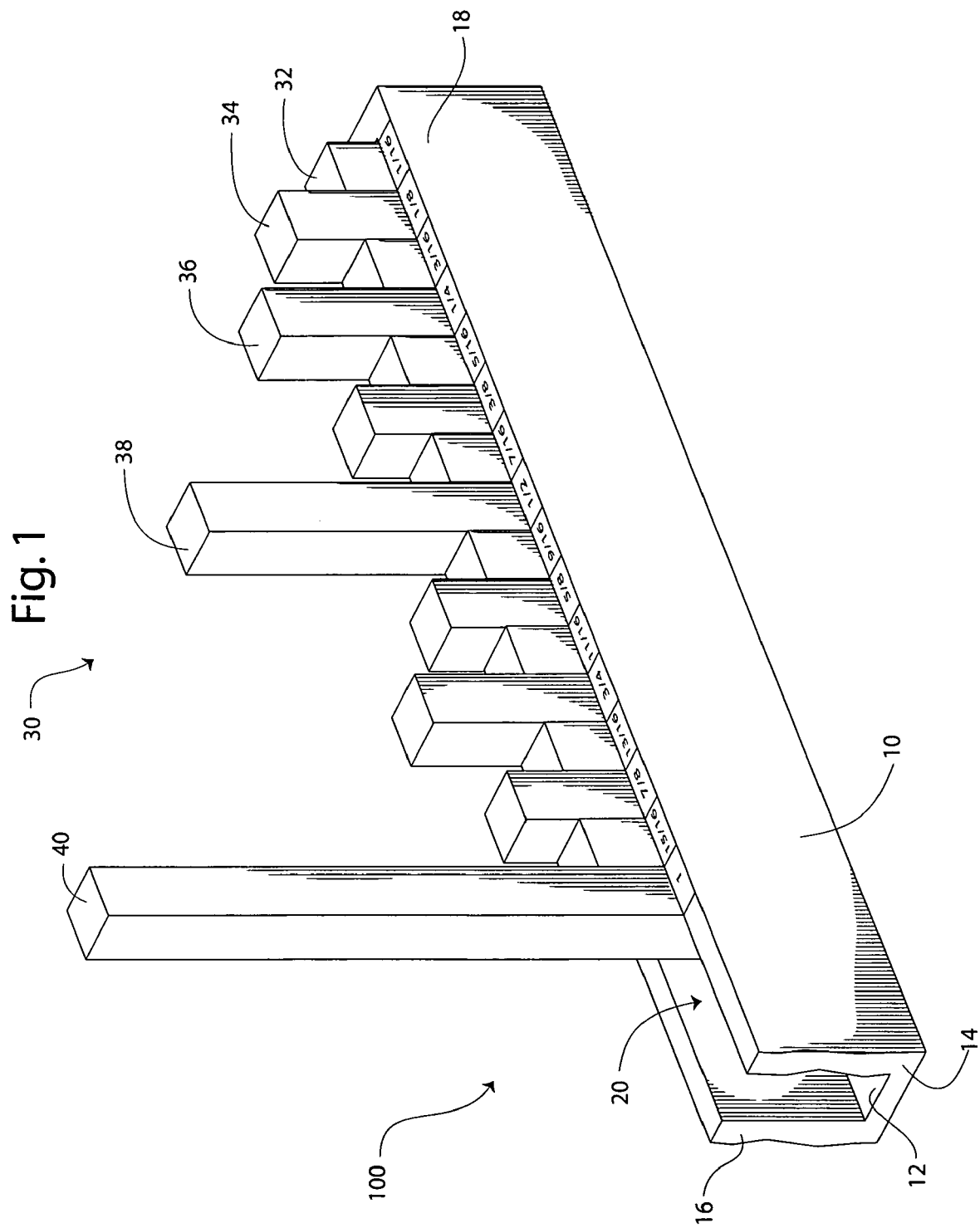
FIG. 1 presents a perspective view of a measurement system apparatus of the present invention, in one embodiment.

FIG. 1 presents a perspective view of a measurement system apparatus 100 of the present invention, in one embodiment. The apparatus 100 first comprises an elongated bar 10. The bar 10 has a base 12 and two side walls 14, 16. In the arrangement of FIG. 1, the base 12 and two side walls 14, 16 define an elongated channel 20. As will be described further below, the channel 20 is configured to receive a plurality of discrete measurement unit pieces 30.

The elongated bar 10 has two opposing ends. A first end is shown at 18 in FIG. 1. The second end is not seen, as the bar 10 is broken for illustrative purposes. Preferably, each end is closed to encapsulate and define the channel 20.

The elongated bar 10 is metered. More specifically, the bar 10 is metered along its length to reflect increments of a measurement system. In the representative bar 10 of FIG. 1, the measurement system is an English standard system for measuring inches. The bar 10 is intentionally not metered to scale so as to aid the student in more clearly seeing the incremental units that make up an inch. In the bar 10 of FIG. 1, a single inch is seen metered, with $1/16$ inch increments provided. However, the bar 10 will preferably have multiple inches metered along its length. In one embodiment, four inches are metered. Preferably, the four inches are incremented so as to actually extend along a length of four feet, though any length that permits the incremental unit pieces 30 to be easily distinguished and manipulated, either manually or through a graphical user interface, may be provided.

It can also be seen from FIG. 1 that the metered units are written onto the bar 10. In the bar 10, $1/16$ inch units are provided. In one aspect, a separate measurement unit piece 30 is placed contiguously along bar 10 to correspond with the individual metered units, or increments. For the bar 10, 16 separate increments are provided for receiving 16 separate measurement unit pieces 30. Again, this is only exemplary, and it is preferred that 64 separate increments be provided for receiving 64 separate measurement unit pieces 30 representing four inches. It is also again noted that the length of the bar 10 should be sufficient to permit the student to easily read the increments along the bar 10. For this reason, the increments should preferably not be to scale, especially where a smaller measurement system such as inches is being taught.

According to the present invention, different measurement unit pieces 30 will be denoted to indicate a corresponding increment. In the arrangement of FIG. 1, separate measurement unit pieces are provided representing $1/16$, $1/8$, $1/4$ and 1 inch increments. Specifically, unit pieces 32 represent the $1/16$ increment positions; unit pieces 34 represent the $1/8$ inch increment positions; unit pieces 36 represent the $1/4$ inch increment positions; unit pieces 38 represent the $1/2$ inch increment positions; and unit piece 40 represents the 1 inch increment positions.

As shown in FIG. 1, the measurement unit pieces extend transversely from said elongated bar so as to illustrate in two dimensions a magnitude relationship between and amongst the sizes and shapes of the plurality of pieces.

Figure 2:
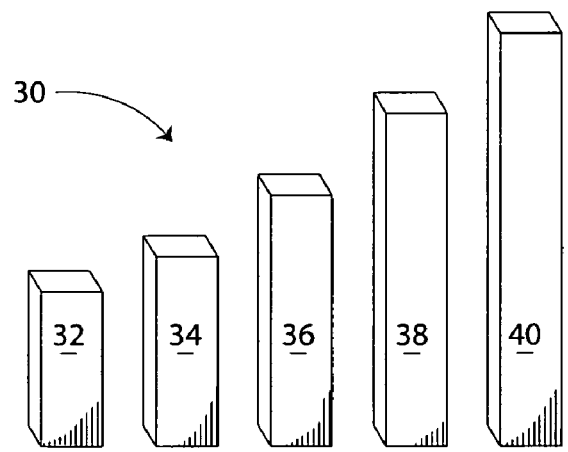
FIG. 2 presents a perspective view of certain of the measurement unit pieces used in the system of FIG. 1.

FIG. 2 presents a perspective view of each of the measurement unit pieces 30 used in the system 10 of FIG. 1. These are separately identified at 32, 34, 36, 38 and 40. Each unit piece 30 may have a different length in order to denote a correlation to a different increment of measurement. However, it is within the scope of the present invention to employ other means for denoting different increments of measurement. For example, different colors or different profiles may alternatively be employed. Preferably, both length and color are used to identify the separate measurement unit pieces 32, 34, 36, 38, 40. In this way, the measurement unit pieces 30 are individually identifiable.

It is also understood that the measurement system apparatus 100 may be used not just to identify linear units in the English system; the apparatus 100 may alternatively be used to identify linear units in the metric system. Thus, for example, the increments may be provided at $1/10$, $1/2$ and 1 centimeter. Alternatively, the increments may be provided at $1/100$ (cm), $1/10$, $1/2$ and 1 meter. Alternatively, the increments may be provided in English units on one side of the elongated bar 10, and in equivalent metric units on the other side of the elongated bar 10. In this instance, separate measurement unit pieces in English and in metric would be provided.

The measurement system apparatus 100 may be used not only to identify linear units; the apparatus 100 may be used to identify volumetric units either in the English system or in the metric system. For example, where the English system is employed, the apparatus 100 may indicate increments such as ounces, cups, pints, quarts and gallons.

It is also noted that the elongated bar 10 need not be a physical device; the bar 10 and its measurement unit pieces 30 may be graphically presented through graphics on a graphics user interface. The student would thus add or remove pieces through a software program installed on a processing unit, or computer.

FIG. 3 presents a perspective view of a measurement system apparatus of the present invention in an alternative embodiment 300. In this embodiment, separate measurement unit pieces 310 are provided representing the $1/16$, $1/8$, $1/4$, $1/2$ and 1 inch increments denoted as 320, 340, 360, 380 and 390, respectively. The measurement unit pieces 310 are of varying proportional widths and can be placed contiguously along the elongated bar 10 to aid the student in understanding the relationship between the measurement increments. It is within the scope of the present invention to have the corresponding widths of the measurement unit pieces 310 representing metric increments such as centimeters, decimeters and meters. In one aspect, the channel 20 is wide enough to accommodate English unit and metric unit pieces side-by-side so that the student may visually correlate the two systems. Further, it is within the scope of the present invention to have measurement unit pieces 310 of varying, proportional widths representing both metric and English increments of volume.

Figure 4:
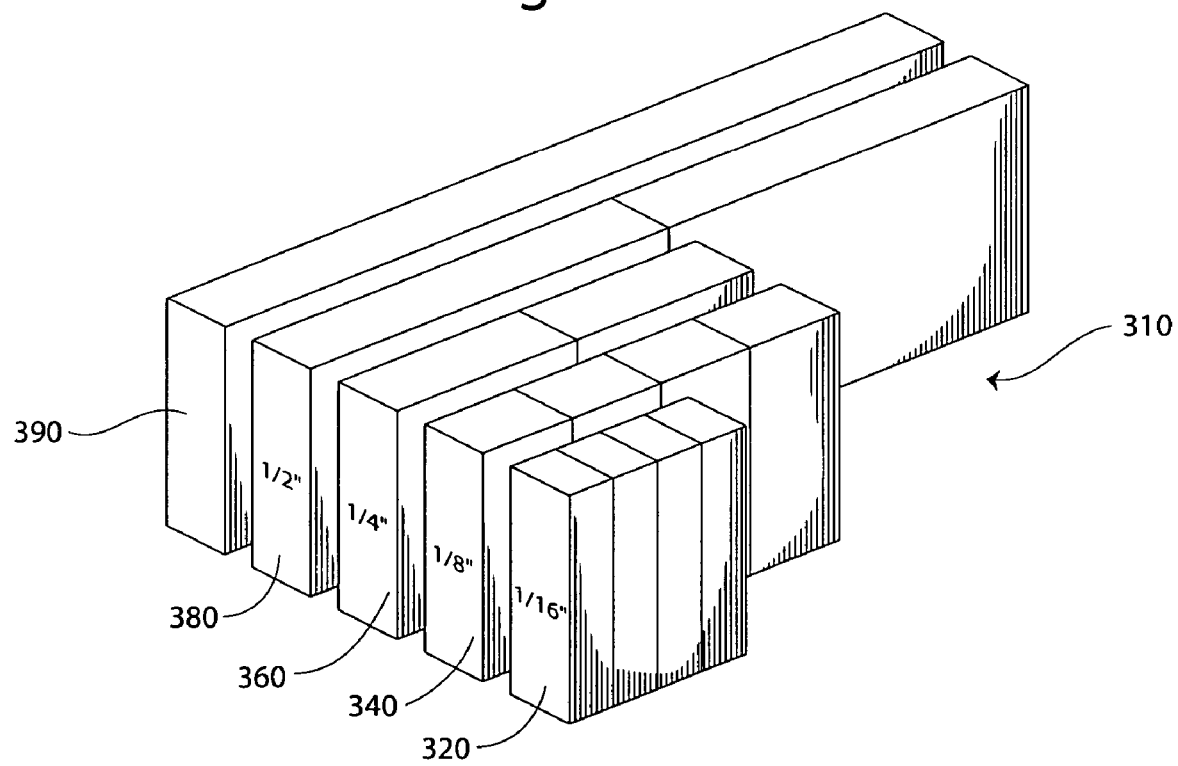
FIG. 4 presents an enlarged view of representative measurement unit pieces as may be part of the system of FIG. 3.

FIG. 4 presents an enlarged view of measurement unit pieces 310 that may be used in the system of FIG. 3. These are separately identified at 320, 340, 360, 380 and 390. Each unit piece 310 has a different width in order to denote a proportional relationship to a different increment of measurement. However, it is within the scope of the present invention to employ other means for denoting different increments of measurement. For example, different colors or different profiles may alternatively be employed. Preferably, both width and color are used to identify the separate measurement unit pieces 320, 340, 360, 380, 390. In this way, the measurement unit pieces are individually identifiable.

Figure 5:
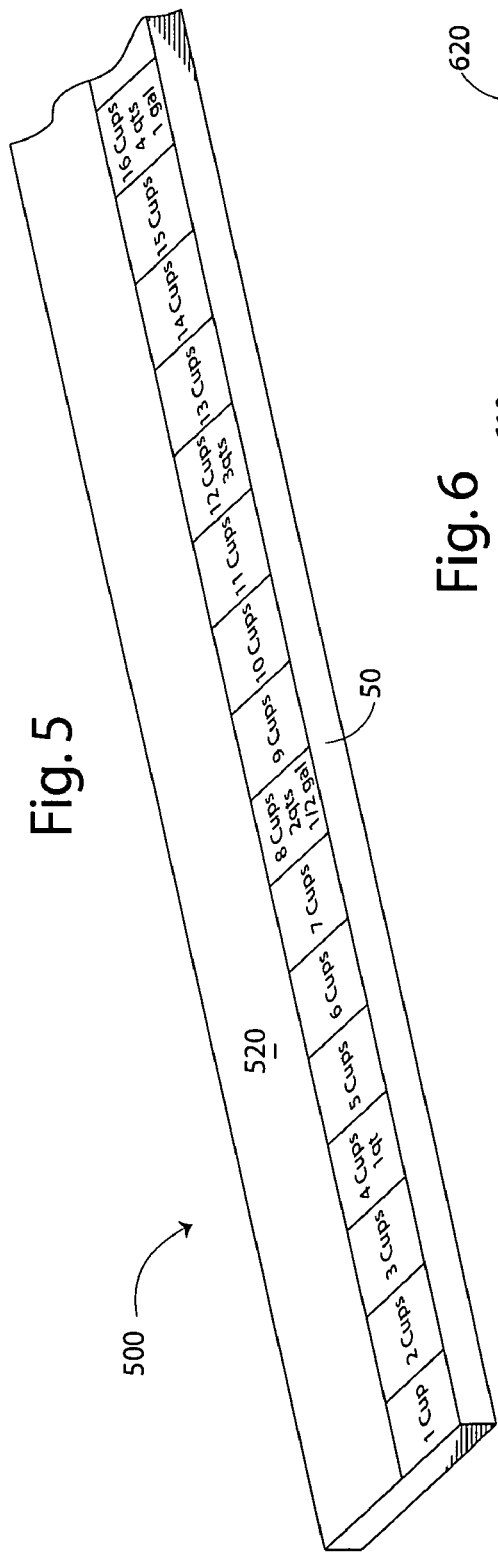
FIG. 5 presents a perspective view of a measurement system apparatus of the present invention, in yet an additional embodiment. The representative elongated bar is metered in English units of volume.

FIG. 5 presents a perspective view of a measurement system apparatus of the present invention in an additional alternative embodiment 500. In the arrangement of FIG. 5, the elongated bar 510 has a top surface 520 configured to directly receive a plurality of discrete measurement unit pieces. The top surface 520 is metered along its length to reflect increments of a volume within the English system. It is within the scope of this alternative embodiment 500 to have a top surface 520 metered to reflect increments of length or volume within the English or metric system. Further, other measurement systems may be represented such as systems for power for force which may be expressed in units based in or derived from the English standard or metric system. In addition, a measurement system based upon musical beats, i.e., quarter notes, half notes, whole notes, etc. may be provided.

Figure 6:
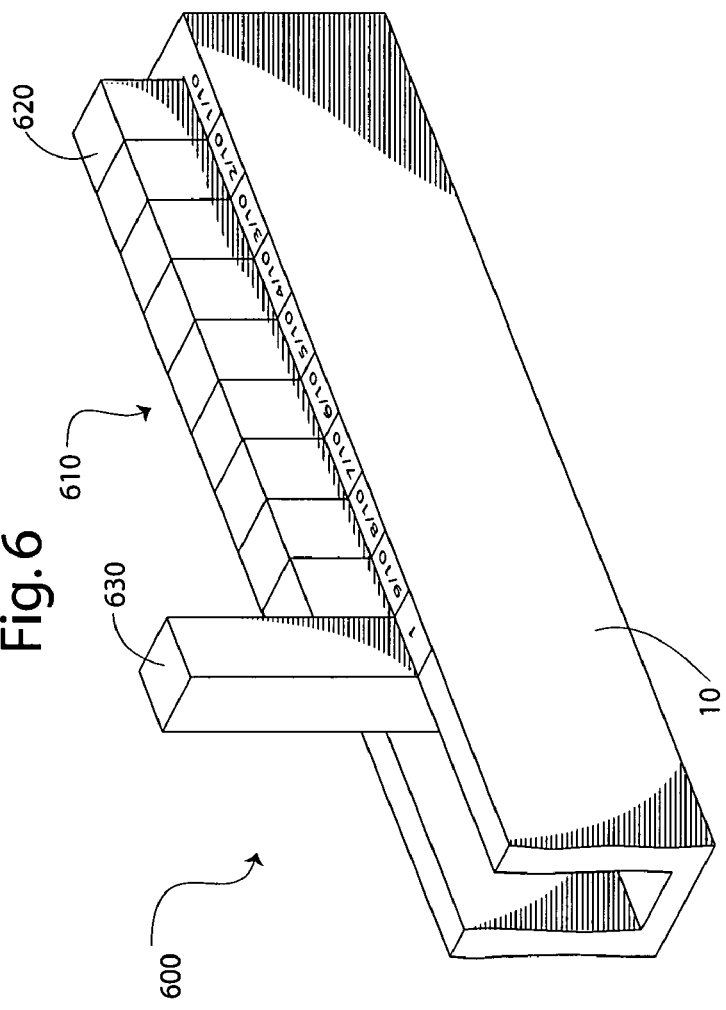
FIG. 6 presents a perspective view of an alternative embodiment for the measurement system apparatus of FIG. 1. The representative elongated bar is metered in metric units of length.

FIG. 6 presents a perspective view of yet an additional alternative embodiment 600 of the measurement system apparatus of FIG. 1. In the arrangement of FIG. 6, the measurement system of length is metric. However, it is within the scope of the present invention to have metric units of volume labeled on the elongated bar 10. The bar 10 is intentionally not metered to scale so as to aid the student in more clearly seeing the incremental units comprising a meter. In the bar 10 of FIG. 6, a single meter is seen metered, with 1/10 meter or decimeter increments provided. However, the bar 10 will preferably have multiple representative meters labeled along its length. In one embodiment, four meters are labeled. However, any length that permits the incremental units 610 to be easily manipulated may be provided.

It can also be seen from FIG. 6 that the metered units are written onto the bar 10. In the bar 10, decimeter units are provided. Discrete measurement unit pieces 610 are placed contiguously along bar 10 to correspond with the individual metered units, or increments. For the bar 10, ten separate increments are provided for receiving ten separate measurement unit pieces 610. Again, this is only exemplary, and it is preferred that 40 separate increments be provided for receiving 40 separate measurement unit pieces 610 representing four meters. It is also again noted that the length of the bar 10 should be sufficient to permit the student to easily read the increments along the bar 10. For this reason, the increments should preferably not be to scale, at least where a smaller measurement system such as decimeters is being taught.

According to the present invention, different measurement unit pieces 610 will be denoted to indicate a corresponding increment. In the arrangement of FIG. 6, separate measurement unit pieces are provided representing decimeter and one meter increments. Specifically, unit pieces 620 represent the 1/10 meter increment positions; while measurement unit piece 630 represents the 1 meter increment position. However, it is within the scope of this invention to have unit pieces representing other base-ten increments such as millimeters and centimeters.

As noted, a method of instructing a student as to a measurement system is also provided. The method is disclosed in the context of the embodiment illustrated by FIG. 1 but may be performed through the use of any of the embodiments disclosed herein. In one aspect, the method first comprises the step of providing an elongated bar 10, with the bar 10 being metered along its length to reflect increments of a measurement system. A plurality of measurement unit pieces 30 corresponding to the metered increments of the measurement system is provided. The measurement unit pieces 30 are denoted to correspond to different increments of the measurement system. Preferably, the pieces 30 are denoted by both length and color as described above. For instance, 1/16 unit pieces 32 may be red; 1/4 unit pieces 34 may be green; and so forth.

A first portion of the plurality of the measurement unit pieces 30 is placed along the elongated bar 30. The pieces 30 may be positioned in a channel 20. Alternatively, other holding arrangements such as a clip or magnetic attraction may be provided. The pieces 30 are positioned adjacent to one matter each piece 30 corresponds to a respective unit of measurement. In this way, a first measurement portion is produced. Where, for example, the measurement system is linear, then the first measurement is a measurement of length.

In one aspect, a second step of placing a second portion of the plurality of the measurement unit pieces 30 along the elongated bar 10 is provided. The pieces of the second portion are positioned adjacently so as to individually correspond to a respective unit of measurement. In addition, the pieces of the second portion are placed adjacent to the pieces of the first portion so that a second measurement is produced from the combined first and second portions. Where the measurement system is linear, then the second measurement is a measurement of length.

In another aspect, the method includes the step of removing some of the first portion of the plurality of the measurement unit pieces from along the elongated bar 10. In this way, a second measurement is produced that is less than the first measurement.

Using this method, the student may more fully and quickly comprehend the structure of any given measurement system and its corresponding incremental units.

It should again be understood that the disclosed embodiments are merely exemplary of the inventions, which may be embodied in various forms. Therefore, the details disclosed herein are not to be interpreted as limiting, but merely as the basis for the claims and as a basis for teaching one skilled in the art how to make and/or use the invention.

I claim:

1. A system for teaching units of measure, the system comprising:
    an elongated bar having substantially parallel opposing walls disposed along a longitudinal portion thereof, thereby establishing a channel shaped space between said opposing walls, wherein at least one of said opposing walls is metered in accordance with the units of a measurement system; and
    a plurality of discrete colored measurement unit pieces of various sizes and shapes, said measurement unit pieces extending transversely from said elongated bar so as to illustrate in two dimensions a magnitude relationship between and amongst the sizes and shapes of said plurality of measurement unit pieces.

2. The system of claim 1, wherein said measurement system is a system of length.

3. The system of claim 1, wherein said elongated bar is metered in accord with at least two measurement systems, wherein one of said two measurement systems is represented on one side of said elongated bar and the other of said two measurement systems is represented on an opposing side.

4. The system of claim 1, wherein individual measurement unit pieces represent incremental units of 1/2, 1/4, 1/8, and 1/16 inches, respectively.

5. The system of claim 1, wherein the measurement system is a volumetric system.

6. The system of claim 5, wherein the volumetric system is according to the English standard system.

7. The system of claim 5, wherein the volumetric system is a metric-based system.

8. The system of claim 6, wherein an English standard system is represented by incremental units of cups, quarts, and gallons.

9. A method of teaching units of measurement, comprising:
    disposing an elongated bar having substantially parallel opposing walls along a longitudinal portion thereof in communication with a channel shaped space formed between said opposing walls, with at least one of said opposing walls being metered in accordance with the units of a measurement system; and
    disposing a plurality of discrete colored measurement unit pieces of various sizes and shapes in communication with said channel shaped space such that pieces extend transversely from said elongated bar so as to illustrate in two dimensions a magnitude relationship between and amongst the sizes and shapes of said plurality of measurement unit pieces.

10. The method of claim 9, wherein the measurement unit pieces represent incremental units of ½, ¼, ⅛, and 1/16 inches, respectively.

11. The method of claim 9, wherein the measurement system is a volumetric system selected from the group consisting of the English standard system and a metric system.

12. The method of claim 11, wherein the measurement system is according to the English standard system represented by incremental units of cups, quarts, and gallons.

* * * * *